(12) United States Patent
Engelhardt

(10) Patent No.: US 6,493,135 B1
(45) Date of Patent: Dec. 10, 2002

(54) TEMPERATURE REGULATED MICROSCOPE

(75) Inventor: Johann Engelhardt, Bad Schönborn (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/622,425

(22) PCT Filed: Feb. 17, 1999

(86) PCT No.: PCT/DE99/00434

§ 371 (c)(1), (2), (4) Date: Aug. 16, 2000

(87) PCT Pub. No.: WO99/42886

PCT Pub. Date: Aug. 26, 1999

(30) Foreign Application Priority Data

Feb. 17, 1998 (DE) .......................................... 198 07 618

(51) Int. Cl.[7] .............................. G02B 21/26; H05B 3/00
(52) U.S. Cl. ........................ 359/395; 359/368; 359/391; 219/200

(58) Field of Search .......................... 359/368, 391–395, 359/820; 219/200–201

(56) References Cited

U.S. PATENT DOCUMENTS

| 4,629,862 A | * | 12/1986 | Kitagawa et al. | ............ 359/395 |
| 5,181,382 A | * | 1/1993 | Middklebrook | ............. 359/395 |
| 5,343,018 A | * | 8/1994 | Limbach | ..................... 219/200 |
| 5,410,429 A | | 4/1995 | Focht | ........................ 359/395 |
| 6,239,905 B1 | * | 5/2001 | Toyoda et al. | .............. 359/392 |

FOREIGN PATENT DOCUMENTS

JP           08114750           5/1996

* cited by examiner

Primary Examiner—Thong Nguyen
(74) Attorney, Agent, or Firm—Simpson & Simpson, PLLC

(57) ABSTRACT

A microscope with an objective turret (2) carrying an objective (1) and with a specimen holder (4) serving to receive a specimen (3), in order to assure an undesired transport of heat between the specimen (3) and the objective (1), is characterized by the fact that all objectives (1) carried by the objective turret (2) are simultaneously adjusted for temperature by means of the objective turret (2).

27 Claims, 4 Drawing Sheets

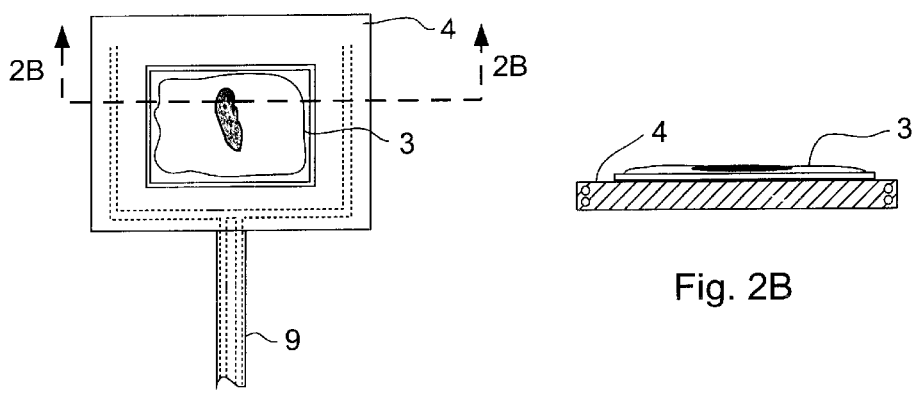
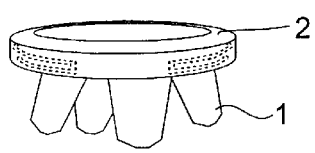
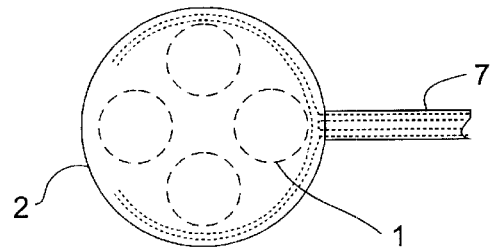

TEMPERATURE REGULATED MICROSCOPE

CROSS-REFERENCES TO RELATED APPLICATIONS

The present application is the U.S. national phase under 35 U.S.C. 371 of International Application No. PCT/DE99/00434 filed Feb. 17, 1999 claiming priority of German Patent Application No. 198 07 618.5 filed Feb. 17, 1998.

BACKGROUND OF THE INVENTION

1. Field of the Invention

The invention relates to a microscope with an objective turret that carries at least one objective and with a specimen holder for receiving a specimen.

2. Description of the Related Art

In actual practice, microscopes of the type under discussion here are known in the most differing designs. In the case of reflecting specimens, they operate according to the reflected light process, while transparent specimens are examined according to the transmitted light process.

Particularly in applications in the field of biology, medicine, etc., it is increasingly the case that "living" objects are examined. Here it is often necessary to maintain the specimen under physiological conditions, including during the process of microscopic examination. This means that cell cultures, for example, during observation or measurement must be kept, e.g., at 37° C., in order to assure the physiological conditions.

Adjusting the temperature of a specimen is problematic particularly in the case of microscopic examination at higher magnifications, specifically because there is only an extremely small working distance between the objective and the specimen. Even in the case of specimens that at first are successfully adjusted for temperature, the heat transfer over the microscope objective is so intense that the temperature directly at the point of examination, i.e., at the point nearest to the objective, is closer to the temperature of the objective than to the temperature around the slide or directly at the slide, as achieved by temperature adjustment. This works against microscopic examination or investigation of a temperature-adjusted specimen at high magnifications.

It is already known from actual practice to improve the described situation by directly heating the objective in use. To this end, heating sleeves have been positioned around the objective in order to bring the objective to the desired specimen temperature. The flow of heat over the microscope objective is thereby effectively prevented.

In actual practice, however, the solution known from the prior art for the indicated problem is extremely problematic, since the heating sleeve is positioned outside of and around the objective and when an objective turret is used the heating sleeve obstructs the adjacent positions of this objective when other objectives are used. Furthermore, application of the heating sleeve is associated with a considerable expense in time, which is particularly disruptive when the objective must be constantly changed to obtain different magnifications. The resulting expense is ultimately unacceptable. When the objective is changed, furthermore, it is not only necessary to remount the heating sleeve. The new objective must also be reheated, and here again much time is required. In any case, a rapid examination is not possible using the methods for heating individual objectives known from actual practice.

Finally, in actual practice it is also necessary to cool the specimens or slides. In this matter, the above remarks apply equally.

SUMMARY OF THE INVENTION

The invention is thus based on the problem of designing and elaborating a microscope of the indicated type, in such a way that, even when the objectives are constantly changed by means of the objective turret, the flow of heat over the microscope objective in momentary use is effectively avoided.

The microscope according to the invention solves the stated problem by an arrangement whereby all objectives carried by the objective turret are simultaneously adjusted for temperature by means of the objective turret.

The invention recognizes that the direct temperature-adjustment of only one objective makes no sense if the objective turret carries a plurality of objectives. The space that remains between the objectives is in any case insufficient to position the heating sleeve known from actual practice around the objective in use when the objective turret overall is outfitted with a plurality of objectives.

It is also recognized that during microscopic examination involving constantly changing magnifications it is necessary to simultaneously adjust the temperature of all the objectives on the turret, since otherwise an undesired heat flow from the specimen over the microscopic objective will always take place when a new objective is brought into working position by means of the turret.

Finally, it is recognized that this problem can be solved if all objectives carried by the turret are simultaneously adjusted for temperature by means of the turret. It is essential to the invention, therefore, that the objectives on the turret are not directly adjusted for temperature—as in the prior art—but rather are indirectly adjusted, namely by means of heat conductance from the turret to the individual objective. External means applied to the objective for the purpose of adjusting the temperature of the objective are no longer necessary.

The temperature adjustment of the objective according to the invention can involve both heating and cooling, depending on whether the microscopic specimen is to be heated or cooled. In keeping with the specimen temperature, in any case, the objective can either be heated or cooled, the significant factor being that a constant temperature is maintained at the objective. To this end, a special control or regulating unit is also advantageously provided.

The temperature adjustment of the objective turret is realized in that a heating/cooling unit is positioned around the objective turret. This heating/cooling device is positioned outside of the operating area of the objective, so that the objective will not be obstructed. This heating/cooling device may advantageously take the form of a heating/cooling sleeve like that heretofore positioned around the individual objective.

In a particularly advantageous embodiment, the heating/cooling device is integrated into the objective turret. Here the heating/cooling device would not be visible from outside the objective turret and would not be obstructive. Only a line, or a pair of lines, to the objective turret would indicate that a special means was provided there.

In concrete terms, the heating/cooling device might comprise a line through which a flowing medium moves. The flowing medium might be a liquid or a gas. The flowing medium would be heated or cooled outside of the objective turret, while a thermostat for temperature control can be provided directly on the objective turret or inside it. Thus, achieving a preselected final temperature and maintaining that final temperature could be assured with simple means.

As an alternative, the heating/cooling device could comprise Peltier elements, which could cool as well as heat, depending on their polarity. It is also conceivable to provide only a heating device comprising heating resistors. Furthermore, the heating/cooling device could be electronically controlled, with the actual temperature on the objective turret being directly detected by a sensor device.

To avoid an undesired temperature line between the objective turret and the rest of the microscope, or the microscope stand, it is of particular advantage if the objective turret is thermally insulated from the microscope stand. This could be achieved, e.g., by producing the connection between the objective turret and the microscope stand out of a plastic that acts as a thermal insulator.

In a particularly advantageous embodiment that supplements the above indicated measures the platform serving to receive the specimen, or specimen holder, is also adjusted for temperature. To this end, a heating/cooling device could be integrated into the specimen holder; the heating/cooling device can be designed in exactly the same way as the heating/cooling device of the objective turret. For example, both heating/cooling devices could be provided with the same heating/cooling liquid, which in this case would be transported from a common reservoir for temperature-adjusted heating/cooling liquids. The same applies to further possibilities for heating and/or cooling. In similar fashion, it is possible to jointly regulate the heating/cooling device of both the objective turret and the specimen holder, so that the same temperature can be adjusted in both cases.

BRIEF DESCRIPTION OF THE DRAWINGS

FIG. 2A is a top view of the specimen holder of the microscope of FIG. 2;

FIG. 2B is cross-sectional view of the specimen holder generally taken along line 2B—2B of FIG. 2A;

FIG. 2C is perspective view of the turret of the microscope of FIG. 2 comprising an integral heating/cooling device around the turret; and, FIG. 2D is a top view of the objective turret of the microscope of FIG. 2 illustrating an integral heating/cooling device around the turret.

DETAILED DESCRIPTION OF THE PREFERRED EMBODIMENTS

Figure 1:
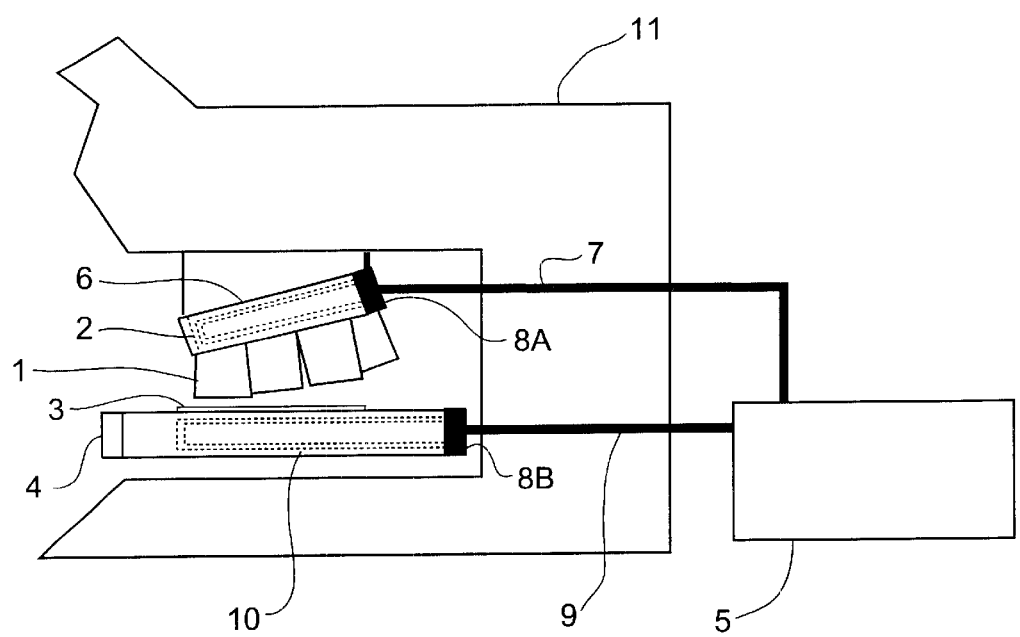
FIG. 1 is a schematic illustration of an embodiment of the microscope of the present invention comprising an external heating/cooling device.
Figure 1A:
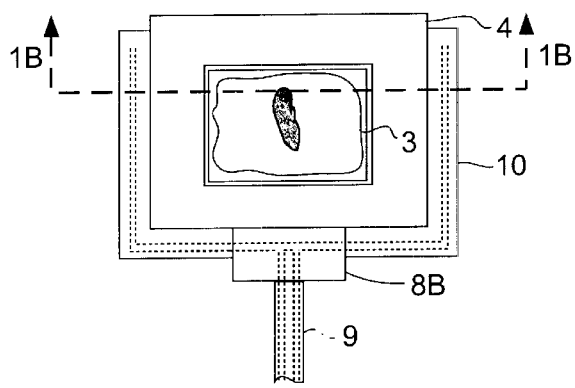
FIG. 1A is a top view of the specimen holder of the microscope of FIG. 1.
Figure 1B:
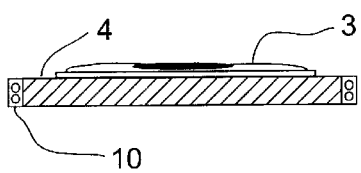
FIG. 1B is cross-sectional view of the specimen holder, generally taken along line 1B—1B of FIG. 1A.
Figure 1C:
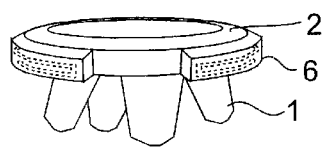
FIG. 1C is perspective view of an external heating/cooling device around the turret of the microscope of FIG. 1.
Figure 1D:
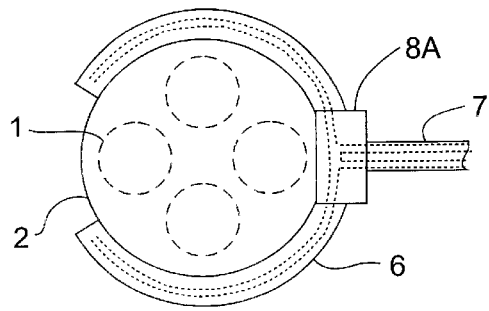
FIG. 1D is a top view of the turret of the microscope of FIG. 1 comprising an external heating/cooling device around the turret.
Figure 2:
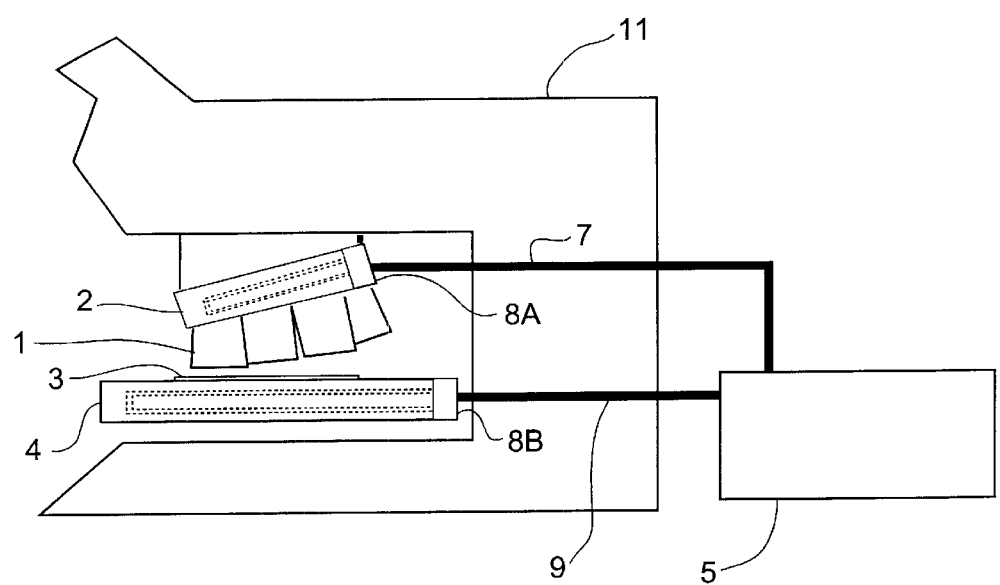
FIG. 2 is a schematic illustration of the present invention comprising an integral heating/cooling device.

FIG. 1 gives a schematic depiction of a microscope comprising a microscope stand 11 for supporting an objective turret 2 that carries an objective or plurality of objectives 1 and a specimen holder 4 that serves to receive a specimen 3. For the sake of simplicity, explanation of the further details of the microscope, which in itself is already known, is omitted.

According to the invention, all objectives 1 supported by the objective turret 2 are simultaneously adjusted for temperature by means of the objective turret 2. In the exemplary embodiment selected here, both cooling and heating are possible.

A special regulating unit 5 is provided in order to achieve a constant temperature. A heating/cooling device 6 comprises a line 7 through which passes a, flowing medium; integrated into the line 7 are corresponding channels into the turret 2. Serving as the cooling/heating medium is a liquid, while the temperature is controlled by a thermostat 8A on or in the turret 2. As an alternative, the heating/cooling device 6 could comprise Peltier elements, which could cool as well as heat, depending on their polarity. It is also conceivable to provide only a heating device comprising heating resistors. Furthermore, the heating/cooling device could be electronically controlled, with the actual, temperature on the objective turret being directly detected by a sensor device.

For the rest, it is essential in the selected exemplary embodiment that the specimen holder can also be temperature-adjusted; it, too, is provided with a cooling or heating flowing medium through line 9. The heating/cooling device 6 of the objective turret 2 and the heating/cooling device 10 of the specimen holder 4 are both connected to the same regulating unit 5, and a thermostat 8B is placed at the specimen holder 4. Thus, both the heating/cooling unit 6 of the objective turret 2 and the heating/cooling unit 10 of the specimen holder 4 are jointly controlled.

Finally, it should be noted that the objective turret 2 is thermally insulated from the microscope stand 11. Thus, an undesirable conduction of heat is avoided to the greatest extent possible, and with it an undesirable cooling of the objective 1.

With respect to other features not shown in the figure, reference is made to the summary part of the description.

List of reference numerals 1 objective
2 objective turret
3 specimen
4 specimen holder
5 regulating unit
6 heating/cooling device (of objective turret)
7 line (to objective turret)
8A, 8B thermostat (of regulating unit)
9 line (to specimen holder)
10 heating/cooling device (of specimen holder)
11 microscope stand

What is claimed is:

1. A microscope comprising:

a microscope stand;

an objective turret supported by said microscope stand for carrying a plurality of objectives;

a specimen holder supported by said microscope stand for receiving a specimen; and means for simultaneously adjusting the temperature of said plurality of objectives.

2. The microscope according to claim 1, wherein said plurality of objectives is heated.

3. The microscope according to claim 1, wherein said plurality of objectives is cooled.

4. The microscope according to claim 1 wherein said plurality of objectives is heated or cooled.

5. The microscope according to claim 4, wherein said means for simultaneously adjusting the temperature of said plurality of objectives includes a regulating unit operatively connected to said objective turret for maintaining said plurality of objectives at a constant temperature.

6. The microscope according to claim 5, wherein said regulating unit includes a thermostat at said objective turret.

7. The microscope according to claim 1, wherein said means for simultaneously adjusting the temperature of said plurality of objectives includes a heating/cooling device positioned around said objective turret.

8. The microscope according to claim 7, wherein said heating/cooling device is a heating/cooling sleeve.

9. The microscope according to claim 7, wherein said heating/cooling device includes a line through which a flowing medium passes.

10. The microscope according to claim 9, wherein said flowing medium is a liquid.

11. The microscope according to claim 7, wherein said heating/cooling device includes Peltier.

12. The microscope according to claim 11, wherein said heating/cooling device is electronically controlled.

13. The microscope according to claim 7, wherein said heating/cooling device includes heating resistors.

14. The microscope according to claim 13, wherein said heating/cooling device is electronically controlled.

15. The microscope according to claim 1, wherein said means for simultaneously adjusting the temperature of said plurality of objectives includes a heating/cooling device integrated into said objective turret.

16. The microscope according to claim 15, wherein said heating/cooling device includes a line through which a flowing medium passes.

17. The microscope according to claim 16, wherein said flowing medium is a liquid elements.

18. The microscope according to claim 15, wherein said heating/cooling device includes Peltier elements.

19. The microscope according to claim 18, wherein said heating/cooling device is electronically controlled.

20. The microscope according to claim 15, wherein said heating/cooling device includes heating resistors.

21. The microscope according to claim 20, wherein said heating/cooling device is electronically controlled.

22. The microscope according to claim 1, wherein said objective turret is thermally insulated from said microscope stand.

23. The microscope according to claim 1, further comprising means for adjusting the temperature of said specimen holder.

24. The microscope according to claim 23, wherein said means for adjusting the temperature of said specimen holder includes a heating/cooling device integrated into said specimen holder.

25. The microscope according to claim 24, wherein said means for simultaneously adjusting the temperature of said plurality of objectives includes a heating/cooling device positioned around said objective turret, and said heating/cooling device of said specimen holder corresponds to said heating/cooling device of said objective turret.

26. The microscope according to claim 24, wherein said means for simultaneously adjusting the temperature of said plurality of objectives includes a heating/cooling device integrated into said objective turret, and said heating/cooling device of said specimen holder corresponds to said heating/cooling device of said objective turret.

27. The microscope according to claim 23, wherein said means for simultaneously adjusting the temperature of said plurality of objectives and said means for adjusting the temperature of said specimen holder share a regulating unit operatively connected to said objective turret and said specimen holder for maintaining said plurality of objectives and said specimen holder at a constant common temperature.

* * * * *

UNITED STATES PATENT AND TRADEMARK OFFICE
CERTIFICATE OF CORRECTION

PATENT NO.    : 6,493,135 B1
DATED         : December 10, 2002
INVENTOR(S)   : Engelhardt, Johann It is certified that error appears in the above-identified patent and that said Letters Patent is hereby corrected as shown below:

<u>Title page,</u>
Item [57], ABSTRACT,
Line 3, the term "assure" should read -- prevent --.

<u>Column 4,</u>
Line 10, in the phrase "which passes a, flowing medium", delete the comma after "a".
Line 19, in the phrase "with the actual, temperature", delete the comma after "actual".

<u>Column 5,</u>
Line 20, the term -- elements -- should be added after "Peltier".
Line 35, the term "elements" should be deleted.

Signed and Sealed this

Twenty-fourth Day of June, 2003

JAMES E. ROGAN
*Director of the United States Patent and Trademark Office*